United States Patent
Shauh et al.

(10) Patent No.: US 7,454,607 B2
(45) Date of Patent: Nov. 18, 2008

(54) TECHNIQUES FOR MANAGING APPLICATIONS IN A PORTABLE COMMUNICATION DEVICE

(75) Inventors: Jack Shyh-Hurng Shauh, San Diego, CA (US); Ahamed Khan Mohammed, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 413 days.

(21) Appl. No.: 11/229,199

(22) Filed: Sep. 15, 2005

(65) Prior Publication Data

US 2007/0061557 A1    Mar. 15, 2007

(51) Int. Cl.
  *G06F 9/00* (2006.01)
  *H04B 1/38* (2006.01)
(52) U.S. Cl. .................... 713/1; 375/222; 709/321
(58) Field of Classification Search .......... 713/1; 375/222; 709/321
  See application file for complete search history.

(56) References Cited

U.S. PATENT DOCUMENTS

| | | | |
|---|---|---|---|
| 6,778,596 B1* | 8/2004 | Tzannes | 375/222 |
| 6,971,004 B1* | 11/2005 | Pleis et al. | 713/100 |
| 7,062,645 B2* | 6/2006 | Kroening | 713/1 |
| 2003/0014561 A1* | 1/2003 | Cooper | 709/321 |
| 2003/0041125 A1 | 2/2003 | Salomon | |
| 2004/0223511 A1* | 11/2004 | Tzannes | 370/464 |
| 2005/0198650 A1* | 9/2005 | Ford et al. | 719/321 |
| 2006/0129600 A1* | 6/2006 | Ode | 707/104.1 |

FOREIGN PATENT DOCUMENTS

| | | |
|---|---|---|
| EP | 1553492 A2 | 7/2005 |
| EP | 1569101 A1 | 8/2005 |
| GB | 2364143 A | 6/2000 |

\* cited by examiner

*Primary Examiner*—Thomas Lee
*Assistant Examiner*—Vincent T Tran
(74) *Attorney, Agent, or Firm*—Joseph B. Agusta; Nicholas J. Pauley; Thomas R. Rouse

(57) ABSTRACT

An arbitration engine manages applications in a portable communication device by identifying a comprehensive DSP image that includes all modules necessary to run a new application as well as currently active applications. The arbitration engine also includes a conflict detector that determines if simultaneously running the new application with the currently active applications results in a rule conflict or a hardware conflict. If no comprehensive DSP image is identified or if a conflict exists, a priority evaluator in the arbitration engine evaluates the priority of the new application relative to the maximum priority of the currently active applications. If the priority is greater than or equal to the maximum priority of the currently active applications, the new application is run.

21 Claims, 4 Drawing Sheets

TECHNIQUES FOR MANAGING APPLICATIONS IN A PORTABLE COMMUNICATION DEVICE

BACKGROUND OF THE INVENTION

The invention relates in general to portable communication devices and more specifically to techniques for managing applications in a portable communication device.

Portable communication devices such as cellular telephones and personal digital assistants (PDAs) are increasingly providing more functions and services. In addition to providing voice communication functions, many portable communications run other applications such as games, video viewing and recording, digital photograph display and capture, sound and music playing, and sound recording applications. Conventional portable communication devices include digital signal processors (DSPs) that run modules that facilitate the operation of the different applications. The modules are sections of firmware code that perform a particular task or calculation. Conventional portable communication devices are limited, however, in that modules required for all supported applications can not be loaded onto the DSP because of the aggregate size of the modules. In addition, the processing power of a DSP engine is not sufficient to simultaneously run all of the modules. Further, no mechanism exists for suspending applications to load modules into the DSP to support other applications.

Accordingly, there is a need for techniques for managing applications in a portable communication device.

DETAILED DESCRIPTION OF THE PREFERRED EMBODIMENTS

The present disclosure is directed to techniques for managing applications in a portable communication device by identifying a DSP image that includes all modules required to simultaneously run active applications and those required to run a new application. In an embodiment, a conflict detector confirms that no hardware conflict or rule conflict exists before a DSP qualifier identifies a comprehensive DSP image from a set of DSP images. The comprehensive DSP image includes a set of modules required by currently active applications as well as modules required by the new application. If no comprehensive DSP image can be identified or if a conflict is detected, a priority evaluation is performed to determine if any applications should be suspended or if the new application should be rejected.

Figure 1:
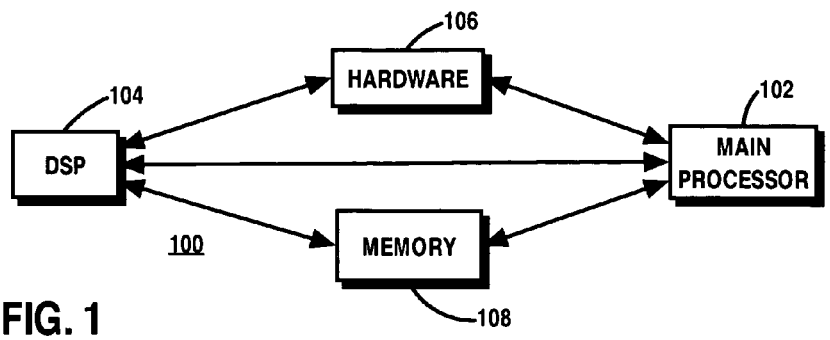
FIG. 1 is a block diagram of a portable communication device.

FIG. 1 is a block diagram of portable communication device 100 according to an embodiment. The portable communication device 100 is any device such as cellular telephone or wireless personal digital assistant (PDA) that provides communication services as well as running one or more other applications. The portable communication device 100 at least includes a main processor 102, a digital signal processor (DSP) 104, memory 108, and hardware 106.

The main processor 102 may be any controller, processor, micro-processor or processor arrangement that executes code of the various applications, software, and communication protocols that facilitate the overall functionality of the portable communication device 100. The main processor 102 may comprise processing capability dispersed among one or more application specific integrated circuits (ASICs) or other hardware capable of processing computer software. An example of a suitable ASIC for wireless communications is a Mobile Station Modem (MSM) chip which incorporates the processor 102 and other Code Division Multiple Access (CDMA) functionality. The MSM is responsible for modulation and demodulation of CDMA signals in order to maintain a communications link with the cellular network.

The DSP 104 is a high speed processor that performs computationally intensive or speed sensitive tasks. The DSP 104 and the main processor 102 may be implemented within the same ASIC. Further, other types of processor, microprocessors, FPGAs, and integrated circuits may be used in some circumstances to perform the functions described herein without departing from the scope of the invention. During operation of the portable communication device 100, applications running on the main processor invoke processes on the DSP 104. For example, a music player application running on the main processor 102 may invoke an MP3 module on the DSP 104 to perform MP3 decoding.

The portable communication device 100 includes hardware 106 such as input and output devices. Examples of hardware 106 include speakers, microphones, keypads, displays, buttons, LEDs, and camera sensors. The hardware 106 includes individual devices or components for performing particular functions. A hardware 106 component may include multiple discrete components and may include logical gates or processor devices in some circumstances.

The memory 108 includes any combination of non-volatile and RAM memory devices that allow for storage of data and code. DSP modules are stored in memory and loaded into the DSP 104 to facilitate the execution of the processes running on the DSP 104. All of the modules required for all applications may not be capable of being simultaneously loaded in the DSP 104. Accordingly, the modules are arranged within DSP images. A DSP image comprises a set of modules, where each module includes firmware, or other executable code, for operating hardware or performing a particular function for an application running on the main processor. For example, a DSP image may contain a module for performing voice encoding/decoding for voice call processing, a module for performing JPEG encoding for taking photographs, and a module for generating tones for keypad activation. A voice call application and a camera application can run simultaneously with this DSP image and a user can use the portable communication device to take pictures while participating in a voice call.

During operation of the portable communication device 100, one or more active applications perform functions using the modules of the DSP image loaded on the DSP. Accordingly, an active application is an application running on the main processor that is supported by modules loaded on the DSP 104. When a request for new application is made, criteria are evaluated to determine the appropriate action. As discussed herein, therefore, a new application is an application that is not currently running on the main processor and may not be supported by the currently loaded DSP image.

As discussed below with reference to the exemplary embodiment, an arbitration engine running on the main processor 102 manages DSP images that are loaded in the DSP 104. A DSP image qualifier in the arbitration engine identifies a comprehensive DSP image that includes the modules required for the currently active applications as well as those required for a new application. The priority evaluator 206 determines if the new application should be loaded where a hardware conflict or rule conflict exists or where no comprehensive DSP image can be identified.

Figure 2:
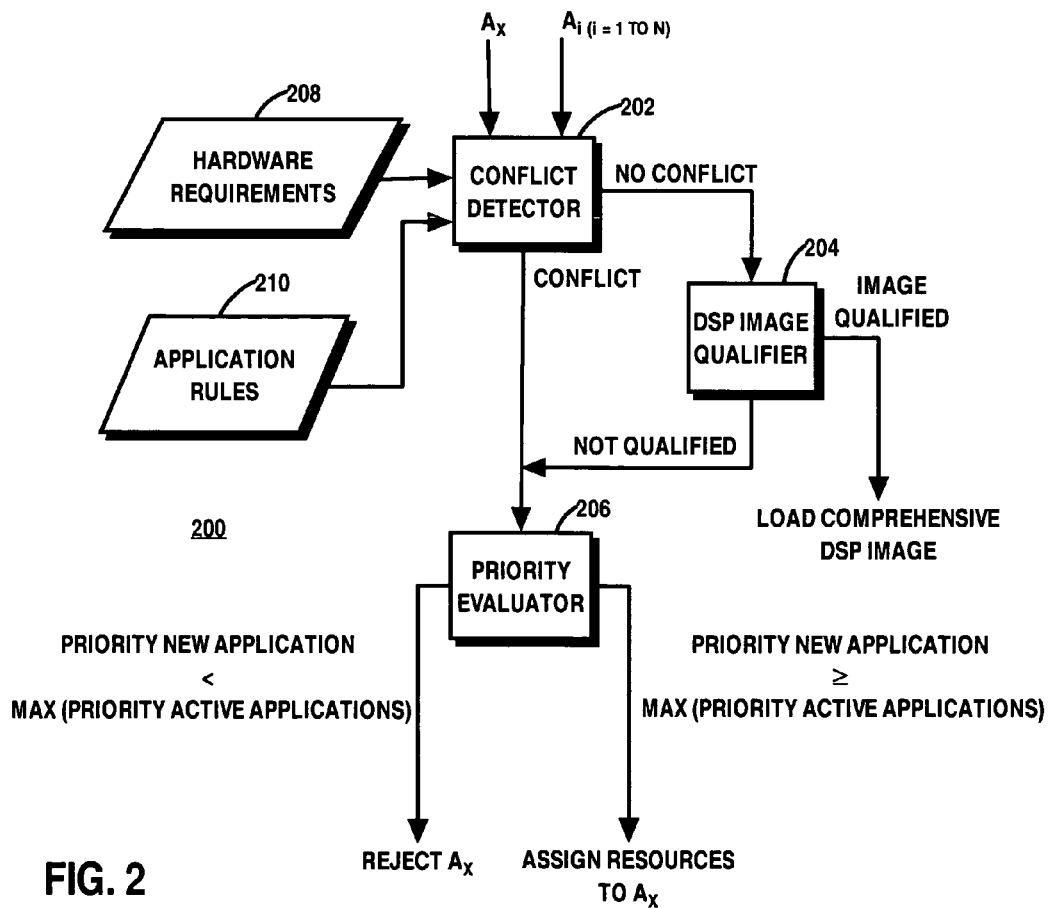
FIG. 2 is a block diagram of an arbitration engine.

FIG. 2 is a block diagram of an arbitration engine 200 in accordance with the exemplary embodiment of the invention. In the exemplary embodiment, the arbitration engine 200 comprises executable code running on the main processor 102 in the portable communication device 100. The functional blocks described with reference to FIG. 2, however, may be implemented using any combination of hardware, software and/or firmware. Also, the functions and operations of the blocks described in FIG. 2 may be implemented in any number of devices, circuits, or infrastructure. Two or more of the functional blocks may be integrated in a single device and the functions described as performed in any single device may be implemented over several devices, software code, or software applications.

The arbitration engine 200 comprises a conflict detector 202, a digital signal processor (DSP) image qualifier 204, and an application priority evaluator 206 in the exemplary embodiment. The conflict detector 202 applies hardware constraints 208 and application operation rules 210 corresponding to the new application and the currently active applications to determine if a hardware conflict or rule conflict exists in simultaneously running the new application ($A_x$) with the currently active applications ($A_i$). In FIG. 2, $A_x$ represents an identifier of the new application and $A_i$ represents an identifier of the currently active applications where i=1 to N and N is the number of currently active applications. After receiving a request to evaluate the new application ($A_x$), the conflict detector 202 retrieves, from memory 108, the hardware requirements 210 for the new application and the currently active applications and retrieves from memory 108 the application operation rules 212 related to the new application. The conflict detector 202 determines if the hardware requirements 208 for the new application and the currently active applications can be met. For example, if the new application, as well as one of the currently active applications, requires a speaker for operation, the conflict detector 202 determines that a hardware conflict exists.

Simultaneously executing a combination of applications may be prohibited by the application rules 210. The applications rules 210 dictate which applications can not be run simultaneously even if the hardware resources 106 are available. An example of an application rule 210 includes the restriction to running a sound recorder application during a voice call. Although hardware may support the simultaneous operation of both applications, the application rule restricts the simultaneous execution of the applications due to legal requirements. In order to avoid the unauthorized recording of a voice call, the application rule 210 prohibits the simultaneous operation of the sound recorded application and the voice communication application.

If no rule conflict or hardware conflict exists in running the new application with the currently active applications, the DSP image qualifier 204 identifies a comprehensive DSP image that will support the execution of the new application and the currently active applications. If a conflict is detected or if the DSP image qualifier can not identify a comprehensive DSP image, the priority evaluator 206 determines, based on priority levels, if currently active applications should be suspended or stopped in order to run the new application.

A DSP image comprises a set of modules, where each module includes executable code for operating hardware or performing a particular function for an application. For example, a DSP image may comprise a voice encode/decode module and camera view finding module and a key-press tone generation module. With this DSP image loaded, the user can use the camera view finding feature during a voice call. As described in further detail below, the DSP image qualifier identifies the comprehensive DSP image that includes at least the modules required for the currently active applications and the modules required for the new application. The set of required modules is compared to the modules contained in each DSP image. The DSP image containing all the required modules is identified as the comprehensive DSP image and is loaded onto the DSP 104.

If no comprehensive DSP image is identified or if a conflict exists, the priority evaluator 206 evaluates the priorities of the new application and the currently active application and determines if the new application should be run. In the exemplary embodiment, the priority evaluator 206 determines if the new application has a higher priority than the maximum priority of the currently active applications. The priority level associated with the new application (new application priority) is compared to the maximum priority level of all currently active applications. In the exemplary embodiment, if the new application has a priority that is greater than or equal to the highest priority of the active applications, one or more of the currently active applications are suspended and the new application is invoked and allowed to run. Other criteria may be used to evaluate the priorities in some circumstances. In the exemplary embodiment, all of the currently active applications are suspended or stopped and the resources are assigned to the new application. A DSP image having the required modules to support the new application is loaded and the new application is executed. If the maximum priority of the currently active applications is higher than the priority of the new application, the new application is rejected. In some situations, a procedure can be initiated that analyzes the priority of the applications as well as the DSP images to identify one or more DSP applications that have a lower priority and should be suspended to allow the new application to run. In such situations, not all of the currently active applications are suspended.

Figure 3:
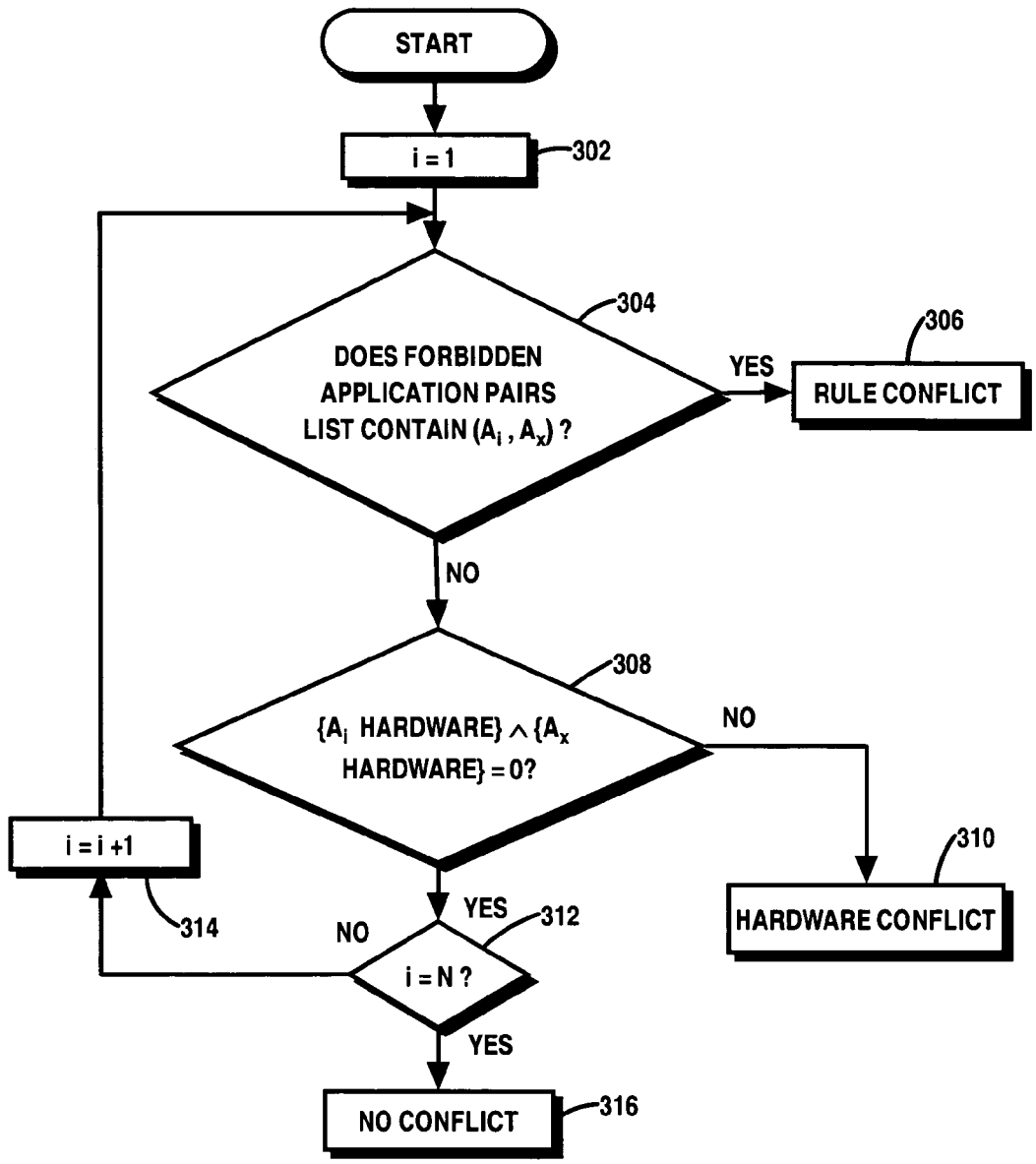
FIG. 3 is a flow chart of a method of performing conflict detection.

FIG. 3 is a flow chart of a method of performing conflict detection in accordance with the exemplary embodiment of the invention. The method may be performed by any combination of hardware, software and/or firmware. In the exemplary embodiment, the method is performed by executing code on the main processor 102.

At step 302, i is set equal to 1.

At step 304, it is determined whether a rule conflict exists. In the exemplary embodiment, each pair of applications containing the new application, $A_x$ and each currently active application, $A_i$ is compared to a prohibited application pairs list. The prohibited application pairs list includes all pairs of applications that are prohibited from running simultaneously by one or more rules. Accordingly, the rules conflicts are reflected within the prohibited applications pairs list in the exemplary embodiment. Other techniques as used in some circumstances to apply the rules to determine if a rules conflict exists by running the new applications with the currently active applications. If the application pair (Ai, Ax) is found in the list, the rule conflict is identified at step 306.

At step 308, it is determined whether the hardware resources 106 required by the currently active applications overlap with the hardware resources needed by the new application. Accordingly, the set of hardware resources for currently active application, Ai, is compared to the set of hardware resources required by new application Ax for each i from 1 to N. If the intersection of the sets is zero (i.e. the null set), no hardware conflict exists and the procedure continues at step 312. If the intersection is not the null set, a hardware conflict is identified at step 310.

A loop formed by steps 304, 308, 312, and 314 increments i from 1 to N until all the current applications have been analyzed, until a rule conflict is detected, or until a hardware conflict is found. At step 312, it is determined if all of the currently active applications ($A_i$, i=1 to N)) have been analyzed. If i is equal to N, all of the hardware requirements of all of the currently active applications have been compared to the hardware requirements of the new application, all of the Ax, Ai pairs have been compared to the prohibited application pairs list, and the procedure continues at step 316. Otherwise, i is incremented by 1 and the procedure returns to step 304.

At step 316, it is determined that no rule conflict or hardware conflict exists in simultaneously running the new application with the currently active applications. The DSP image qualifier 204 of the arbitration engine 200 then attempts to identify the comprehensive DSP image.

Figure 4:
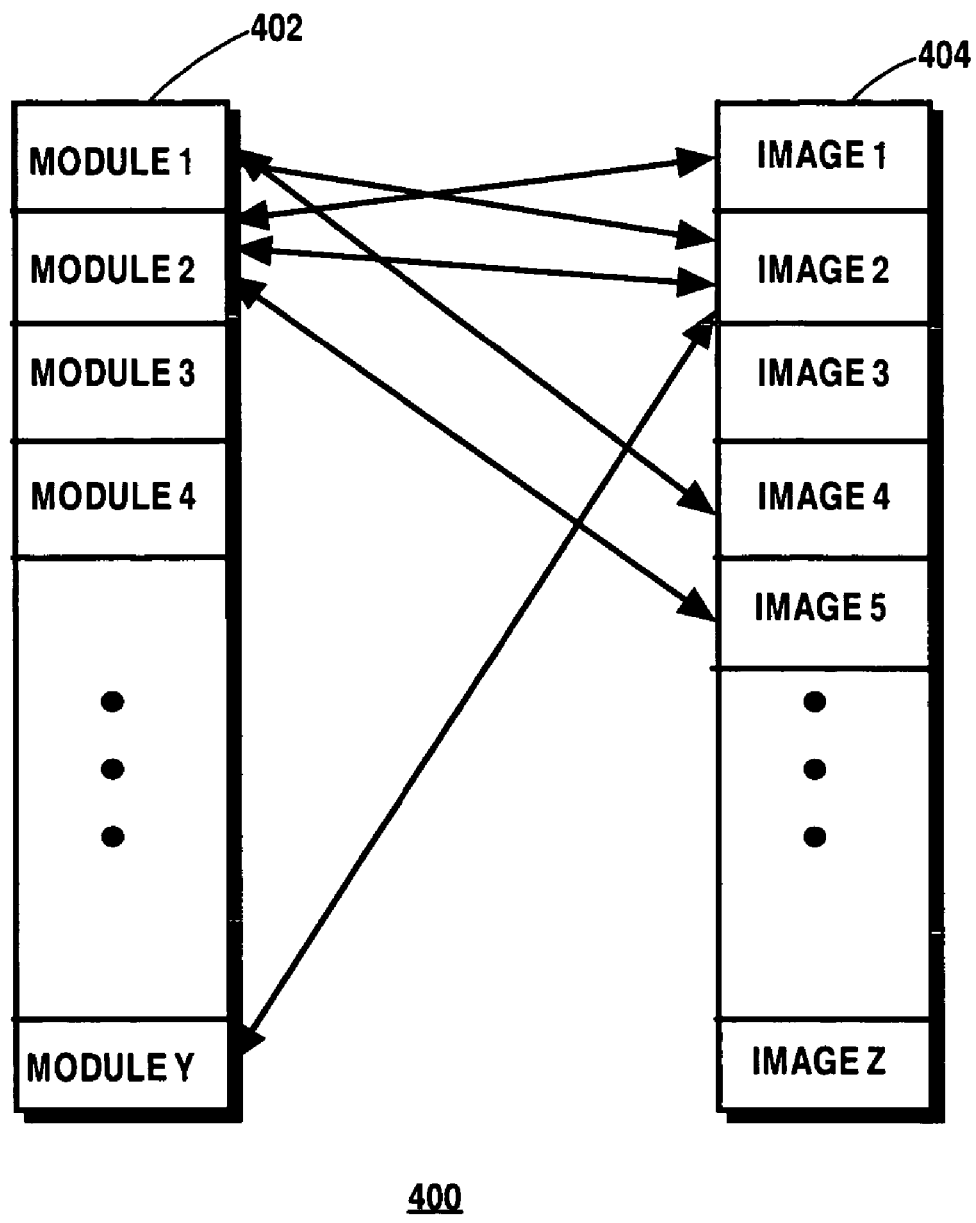
FIG. 4 is a block diagram of the relationship between DSP modules and DSP images

FIG. 4 is a block diagram of the relationship 400 between DSP modules 402 and DSP images 404 in accordance with the exemplary embodiment of the invention. The DSP modules 402 include any number (Y) of modules and the images include any number (Z) of DSP images 404. The arrows in FIG. 4 identify associated DSP images 404 and DSP modules 402. An arrow between a module and an image indicated that the module is within that image. Accordingly, in the example illustrated in FIG. 4, image 1, image 2 and image 5 each include module 2. A DSP image 404 may include any number of modules and a module may be included in any number of images. As discussed in further detail below, an efficient technique of identifying a comprehensive DSP image includes identifying images that contain a module that is less frequently included in images before determining if other required modules are contained in the image. In other words, a frequently included module provides limited information whether a DSP image will meet the requirements of the comprehensive DSP image.

Figure 5:
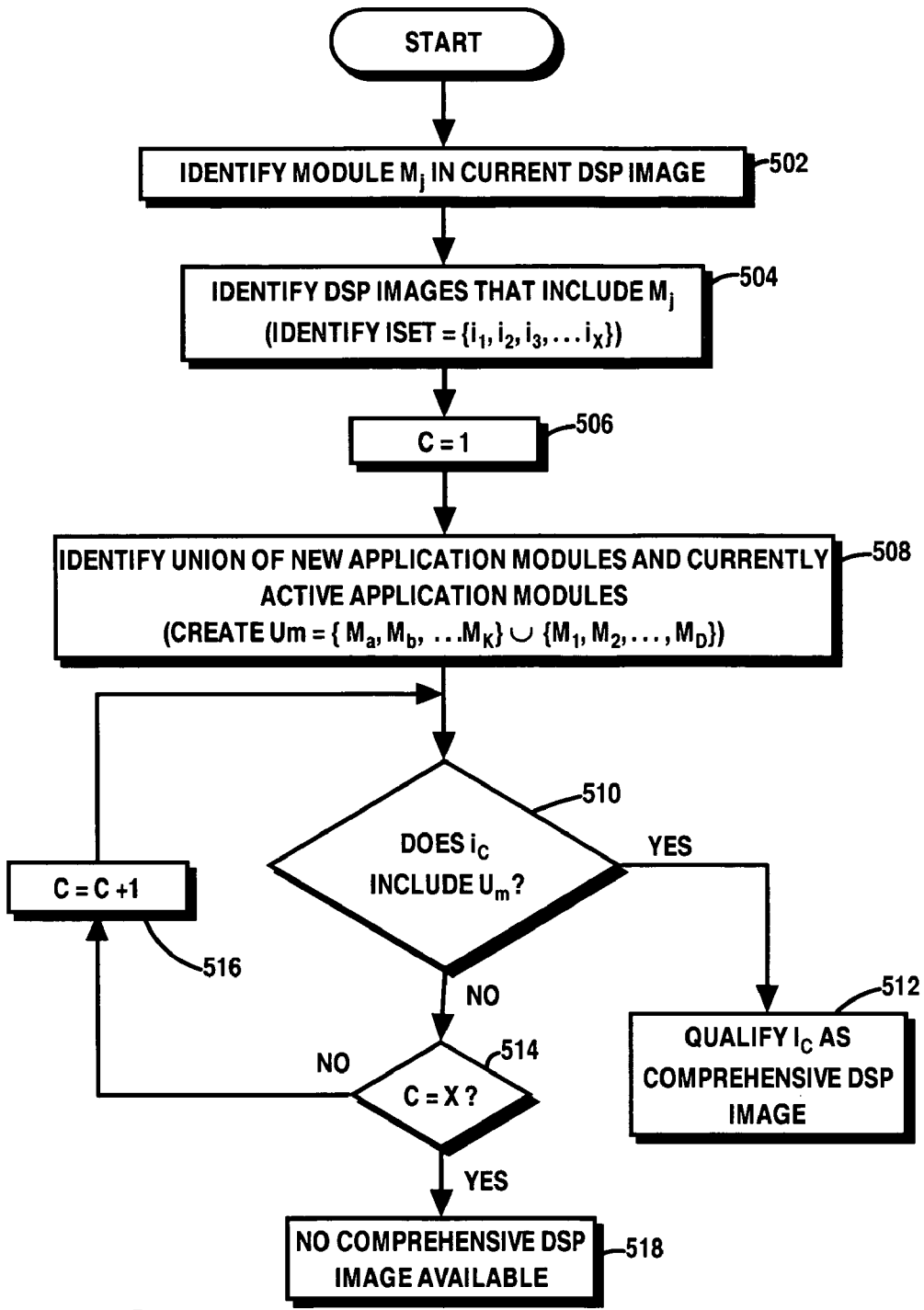
FIG. 5 is a flow chart of a method of identifying a comprehensive DSP image.

FIG. 5 is a flow chart of a method of identifying a comprehensive DSP image in accordance with the exemplary embodiment of the invention. The method may be performed by any combination of hardware, software and/or firmware. In the exemplary embodiment, the method is performed by executing code on the main processor 102. The method described with reference to FIG. 5, therefore, provides an exemplary implementation of the DSP image qualifier 204.

At step 502, a module ($M_j$) within the currently loaded DSP image is identified as a search module. Although a variety of criteria and techniques may be used to identify the search module ($M_j$), $M_j$ is selected based on frequency of inclusion within DSP images in the exemplary embodiment. In the exemplary embodiment, a subset S of the currently used modules $\{M_1, M_2, \ldots M_D\}$ is formed by using $\{M_1, M_2, \ldots M_D\} - \{M_1, M_p, \ldots M_q\}$, where $\{M_1, M_p, \ldots M_q\}$ is a set of most frequently used modules. Module $M_j$ is randomly picked from the set S. In some circumstances, $M_j$ may be selected randomly from the set of currently loaded modules.

At step 504, a set of DSP images that includes $M_j$ are identified (iSET=$\{(i_1, i_2, i_3 \ldots i_X)\}$). Therefore, the module, $M_j$ is identified in the list of modules 402 and the images corresponding to the module are grouped into the iSET.

At step 506, a counter is set to 1.

At step 508, a union set of modules containing the new application modules and the currently active application modules is identified ($U_m = \{M_a M_b, \ldots M_K\} \cup \{M_1, M_2, \ldots M_D\}$, where K is the number of new application modules and D is the number of currently active application modules). Therefore, $U_m$ includes all of the modules required for the new application and all of the modules required for the currently active applications.

At step 510, it is determined if the DSP image includes the union set of modules, $U_m$. If the DSP image does not include at least the modules required for the new application and the modules required for the currently active application, the procedure continues at step 514. If the DSP image includes at least the modules required for the new application and the modules required for the currently active application, the procedure continues at step 512 where the currently analyzed DSP image ($i_C$) is qualified as the comprehensive DSP image. Therefore, if $i_C$ includes Um, $i_C$ is qualified as the comprehensive DSP image. The comprehensive DSP image is loaded into the DSP run to support the new application and the currently active applications.

A loop formed by steps 510, 514, and 516 increments C from 1 to X until all the DSP images in the iSET have been analyzed or until a comprehensive DSP image is identified. At step 514, it is determined whether all of the DSP images in the iSET have been analyzed. If C is equal to X, all of the DSP images in the iSET have been analyzed and the procedure continues at step 518. Otherwise, C is incremented by 1 and the procedure returns to step 510. Accordingly, the set of DSP images are evaluated to identify the comprehensive DSP image.

At step 518, it is determined that no comprehensive DSP image is available. The priority evaluator 202 is invoked to determine if the currently active applications should be suspended or stopped in order to run the new application.

Therefore, in the exemplary embodiment, the arbitration engine 200 determines if there are any hardware or rule conflicts in simultaneously running the new application and the currently active applications. If no conflicts are identified, the DSP image qualifier 204 in the arbitration engine 200 attempts to identify a comprehensive DSP image that includes all of the modules necessary to run the new application and the currently active application. If no comprehensive DSP image is identified or if a conflict is detected, the priority evaluator 206 determines if the new application should be rejected or if it should be run based on the priorities of the new application and the currently active applications.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A method comprising:
   receiving at a portable communication device a request for a new application;
   identifying a search module from a set of currently loaded modules;
   identifying, from a plurality of digital signal processor (DSP) images, a set of DSP images containing the search module;

evaluating the set of DSP images to identify a comprehensive DSP image comprising modules required to support the new application and all currently active applications; and evaluating, if no comprehensive DSP image is identified, a new application priority of the new application relative to a priority of each of the currently active applications to determine if the new application should be invoked.

2. The method of claim 1, further comprising:
loading the comprehensive DSP image into a DSP of the portable communication device.

3. The method of claim 1, wherein the evaluating comprises:
invoking the new application when the new application priority is greater than or equal to a maximum priority of the currently active applications.

4. The method of claim 1, wherein one of the plurality of DSP images includes a voice encode/decode module, a camera view finding module, or a key-press tone generation module.

5. The method of claim 3, further comprising:
identifying one or more of the currently active applications having a corresponding application priority that is lower than the new application priority; and
suspending at least one of the one or more of the currently active applications whose corresponding application priority is lower than the new application priority.

6. The method of claim 5, further comprising:
suspending a currently active application when the new application priority is greater than or equal to the maximum priority of the currently active applications.

7. The method of claim 5, further comprising:
loading, into a DSP, a DSP image of the set of DSP images that supports the new application.

8. The method of claim 1, further comprising:
determining that no rule conflict exists for simultaneously executing the new application with the currently active applications; and
determining that no hardware conflict exists for simultaneously executing the new application and the currently active applications.

9. A method of managing applications in a portable communication device, the method comprising:
determining if a rule conflict exists in simultaneously executing a new application and currently active applications;
determining if a hardware conflict exists in simultaneously executing the new application and the currently active applications;
if no rule conflict exists and no hardware conflict exists, evaluating a plurality of DSP images to identify a comprehensive DSP image comprising modules supporting simultaneous execution of the new application and the currently active applications;
if a comprehensive DSP image is identified, loading the comprehensive DSP image into the DSP; and
if no comprehensive DSP image is identified, evaluating a priority of the new application relative to a priority of each of the currently active applications to determine if the new application should be invoked.

10. The method of claim 9, wherein the hardware conflict arises when the new application and one of the currently active applications employ a same input device or a same output device.

11. The method of claim 9, wherein the hardware conflict arises when the new application and one of the currently active applications employ a same logical gate or a same processor device.

12. The method of claim 9, wherein evaluating comprises:
invoking the new application if the new application priority is greater than or equal to a maximum priority of the currently active applications.

13. The method of claim 12, further comprising:
suspending at least one of the currently active applications if the new application priority is greater than or equal to the maximum priority of the currently active applications.

14. The method of claim 12, further comprising:
loading, into a DSP, a particular DSP image of the plurality of DSP images that is adequate to support the new application.

15. An arbitration engine comprising:
a digital signal processor (DSP) image qualifier configured to:
identify, from a plurality of DSP images, a comprehensive DSP image comprising application modules to support a new application and currently active applications;
identify a search module from a set of loaded modules;
identify, from the plurality of DSP images, a set of DSP images containing the search module; and
evaluate the set of DSP images to identify the comprehensive DSP image; and
a priority evaluator configured to evaluate, if no comprehensive DSP image is identified, a priority of the new application relative to a priority of each of the currently active applications to determine whether the new application should be invoked.

16. The arbitration engine of claim 15, wherein the priority evaluator is further configured to:
determine the new application should be run if the new application priority is greater than or equal to a maximum priority of the currently active applications.

17. The arbitration engine of claim 15, further comprising:
a conflict detector configured to:
identify a conflict in simultaneously running the new application and the currently active applications.

18. The arbitration engine of claim 15, wherein one of the plurality of DSP images includes a module to perform voice encoding/decoding, to perform Joint Photographic Experts Group (JPEG) encoding, or to generate tones.

19. The arbitration engine of claim 17, wherein the conflict is a hardware conflict.

20. The arbitration engine of claim 17, wherein the conflict is a rule conflict.

21. An arbitration engine for managing applications running on a main processor in a portable communication device, the arbitration engine comprising:
a conflict detector configured to identify a conflict in simultaneously running a new application and currently active applications;

a digital signal processor (DSP) image qualifier configured to identify, from a plurality of DSP images, a comprehensive DSP image comprising required application modules to support a new application and the currently active applications; and a priority evaluator configured to evaluate, if the no comprehensive DSP image is identified or if a conflict is detected, a new application priority of the new application relative to a current priority of the currently active applications to determine if the new application should be invoked.

* * * * *